(No Model.)
E. A. BEHRENS.
BLEACHING AND REFINING RESINS AND OTHER SUBSTANCES.
No. 395,731. Patented Jan. 8, 1889.
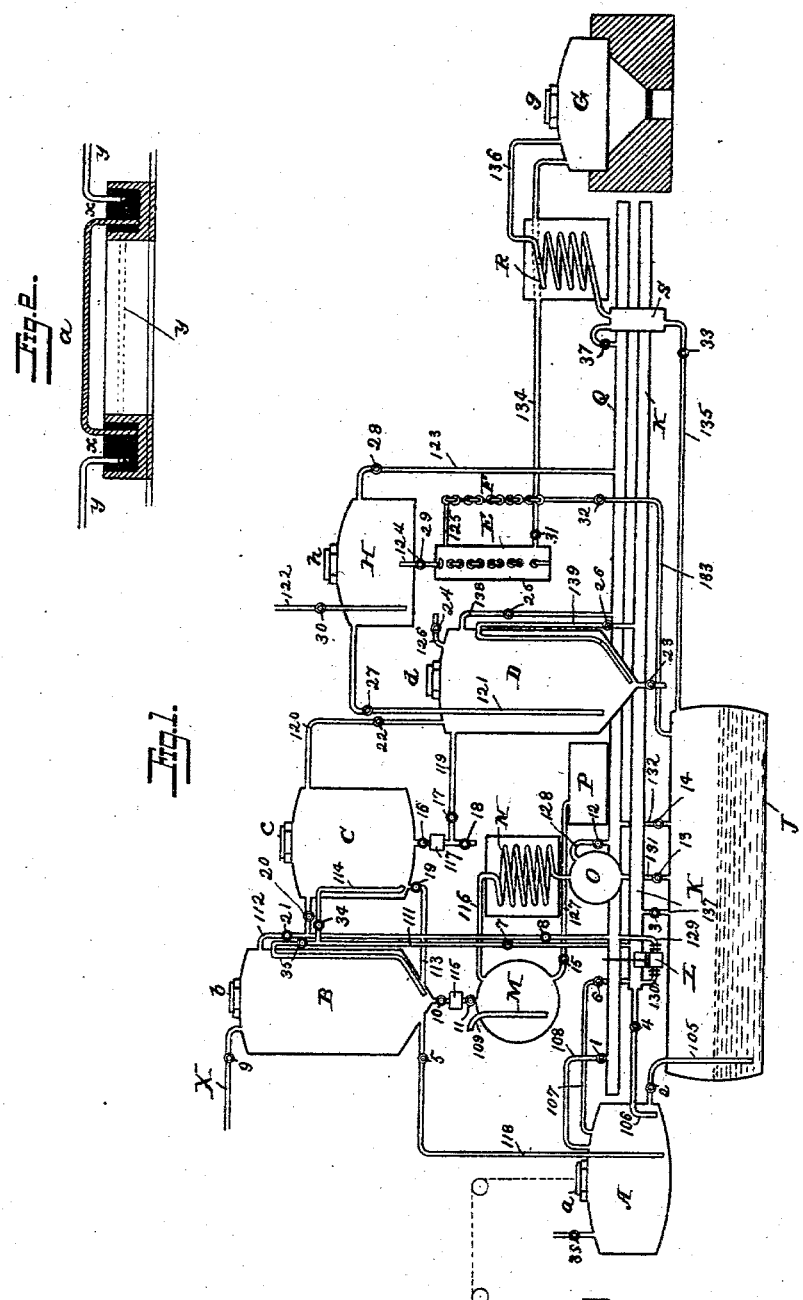
Witnesses.
Jno. G. Hinkel Jr.
J. S. Barker.
Inventor,
E. A. Behrens
by Foster & Freeman
Attorneys

UNITED STATES PATENT OFFICE.

ERNST AUGUST BEHRENS, OF BREMEN, GERMANY.

BLEACHING AND REFINING RESINS AND OTHER SUBSTANCES.

SPECIFICATION forming part of Letters Patent No. 395,731, dated January 8, 1889.

Application filed October 31, 1885. Serial No. 181,548. (No model.) Patented in Germany June 7, 1885, No. 35,030; in England September 19, 1885, No. 11,177, and in Belgium September 21, 1885, No. 70,262.

*To all whom it may concern:*

Be it known that I, ERNST AUGUST BEHRENS, doctor of philosophy, a subject of the King of Prussia, residing at Bremen, in the Empire of Germany, have invented new and useful Improvements in Bleaching and Refining Resins and Similar Substances, (for which I have received Letters Patent in Germany, dated June 7, 1885, No. 35,030; in England, dated September 19, 1885, No. 11,177, and in Belgium, dated September 21, 1885, No. 70,262,) of which the following is a specification.

This invention relates to a new process for bleaching and purifying or refining resins and similar substances, especially colophony, in order that the resin may be rendered clear without altering the properties thereof.

The purification and removal from the resin of the discoloring material is best effected under the following conditions: First, the resin must be reduced to a thin liquid condition; second, the decolorizing process must be carried on at a temperature below the melting-point of the resin, and, third, it must be possible to entirely remove the bleaching substances after having acted upon the resin. To meet these conditions I dissolve the resin to be refined in a solvent having a low boiling-point, and one which does not readily mix with water—such, for instance, as bisulphide of carbon, sulphuric ether, wood-alcohol, naphtha, or the like.

The process may in general terms be said to consist of the following steps: first, dissolving the resin to be refined in a highly-volatile solvent, which does not mix with water; second, decolorizing the resin so dissolved in substantially the manner followed in decolorizing ordinary mineral oils; third, separating the decolorizing agents from the resin in solution; fourth, separating the bleached resin from the solvent and reconverting the latter without essential loss.

I first dissolve the resin in a highly-volatile solvent—as, for instance, naphtha—by combining the same in a closed vessel. The resin will be completely dissolved thereby, while the impurities and coloring-matters will remain undissolved, and will be removed from time to time during the subsequent steps of the process.

The decolorizing of the resin is effected by the action of a reagent—such as a highly-concentrated soda or potash lye, by sulphuric acid, or by washing with water. By combining such caustic lye with the dissolved resin at a temperature below the melting-point of the latter I am enabled to use only a small quantity of the lye, which dissolves or destroys the coloring-matter, while only a very small quantity of the resin is chemically affected thereby. I thereby separate the dye-stuff from the resin without saponifying the latter, which would be the case were the resin and caustic lye mixed at a higher temperature. The perfect separation of the lye, which for my purpose is absolutely necessary, is only possible by reason of the thinly-liquid condition of the resin at a low temperature. This enables me to use small quantities of sulphuric acid in order to further destroy the coloring-matter without affecting the mass of resin itself, in a similar way to that followed in bleaching mineral oils, and without the discoloration which would be consequent upon a higher temperature, were it employed.

The whole process is particularly important in that the dissolvent is recovered in a practically unaltered condition and nearly without loss, while the temperature is at no time so raised as to cause the materials to be by the heat changed to a darker or objectionable hue. It results, therefore, that only dissolvents having a low boiling-point may be employed, and that they should be used in closed apparatus, so that loss can be avoided, which would otherwise occur by the escape of the air contained in the apparatus charged with the volatile dissolvent. For this reason I dispense with the use of pumps for transporting the liquids from one part of the apparatus to another and employ in place thereof atmospheric pressure, in a manner to be hereinafter described.

In order that the process may be better understood, I will describe an apparatus adapted to carry out the same.

In the drawings, Figure 1 represents an arrangement of apparatus for performing the above process, and Fig. 2 a detail.

A is the receptacle for the resin to be purified.

B, C, and D are purifiers.

H is a clarifier.

G is a boiler.

L is an air-pump.

Q is an exhaustion or low-pressure pipe connected to the air-pump.

K is a compression or high-pressure pipe connected to the pump.

J is a closed tank for the solvent; H, a receiver for the alkali.

N is a worm for condensing the solvent and connected to the tank M.

O is a receiver connected with the worm.

P is a decomposing-vessel connected with the tank.

E E is the distilling apparatus, containing a series of connected steam-pipes and leading from the clarifier H and communicating with the boiler G.

F is the condensing apparatus leading from the distilling apparatus E, and adapted to be cooled by water or otherwise, and leading to the tank J.

R is a worm connected to the boiler g, and S is a receiver communicating with the worm R and the tank J.

The receiver A is provided with an inlet-pipe having a cock, 36, and communicates from its upper part with the pipe K by means of a pipe, 107, having a cock, 6, and with the pipe Q by means of a pipe, 108, having a cock, 1. The lower part of the receiver A communicates with the pipe K by means of a pipe, 106, provided with a cock, 4, and with the bottom of the tank J by means of a pipe, 105, provided with a cock, 2. The pump L is connected to the pipe K by a branch pipe, 130, and to the pipe Q by a branch pipe, 129.

The receiver A communicates with the receiver B, which is coated with lead, by a pipe, 118, provided with a cock, 5, and extending from the bottom of the receiver to the bottom of the purifier B. The purifier B is provided with a water-inlet pipe, X, having a cock, 9, and is connected near its upper end with an air-exhaust pipe, 112, leading to the pipe Q and having cocks 8 and 21, and also provided below the cock 21 with a branch pipe having a cock, 20, and connected to the upper portion of the purifier C. The purifier B is further provided with an air-inlet pipe, 111, having cocks 7 and 35, and below the cock 35 a branch pipe, 114, having a cock, 34, and leading to the lower part of the purifier C, the said pipe 111 communicating with the pipe K. A pipe, 113, having a cock, 19, connects the lower parts of the purifiers B and C.

The bottom of the purifier B is connected to the receiver H by means of a pipe having a cock, 10, a glass vessel, 115, below the cock 10, and a pipe with a cock, 11, below the glass vessel. The receiver M has a steam-inlet pipe, 109, and has leading from its lower portion a pipe, 127, provided with a cock, 15, and communicating with the decomposing-vessel P.

The worm N communicates at the upper end with the upper part of the receiver M and at the lower end with the receiving-vessel O, which latter is connected at its bottom with the tank J by a pipe, 131, having a cock, 13, and has at its upper portion, by means of a pipe, 128, containing a cock, 12, a suitable connection with the pipe Q. The purifier C is connected at the upper end with the purifier D by a pipe, 120, provided with a cock, 22.

The bottom of the purifier C is connected to a glass vessel, 117, by a pipe containing a cock, 16; and a pipe containing a cock, 18, leads from the said glass vessel and connects above the said cock 18 with a pipe, 119, leading to the upper part of the purifier D, and provided with a cock, 17.

The purifier D communicates with the pipe K by a pipe, 139, opening near the bottom of the said purifier and provided with a cock, 26, and with the pipe Q by a pipe, 138, provided with a cock, 25, and opening near the top of said purifier. The purifier D is also provided at the bottom with an outlet controlled by a cock, 23, and communicates with the clarifier H by means of a pipe, 121, provided with a cock, 27, and leading from the lower portion of the purifier to the upper portion of the clarifier. The purifier D is also provided with a water-inlet pipe, 126, controlled by a cock, 24.

The clarifier H is provided with a pipe, 122, having a cock, 30, for the admission of steam or air, and also communicates with the pipe Q by means of a pipe, 123, having a cock, 28, and opening into the said clarifier near the top thereof. Extending from the bottom of the clarifier to the top of the distilling apparatus E is a pipe, 124, provided with a cock, 29. The distilling apparatus E communicates near the top with a cooling apparatus, F, by means of a pipe, 125, and the said cooling apparatus is connected at the lower end with the tank J by a pipe, 133, provided with a cock, 32.

The lower end of the distilling apparatus E is connected to the boiler G by a pipe, 134, provided with a cock, 31.

The boiler G, which has a suitable furnace, so that the direct heat of a fire may be applied, communicates with the upper end of the worm R by means of a pipe, 136, and the lower end of the said worm R communicates with the receptacle S, which latter is connected by a pipe, 135, provided with a cock, 33, to the tank J, and by a pipe provided with a cock, 37, to the pipe Q.

The tank J is connected to the pipe K by a pipe, 137, provided with a cock, 3, and with the pipe Q by a pipe, 132, provided with a cock, 14.

In Fig. 2 I have represented in detail a means of closing the receivers or vessels A, B, C, D, G, and H and shown at $a\ b\ c$, &c., which consists of a cap, $a$, with an annular flange adapted to rest in an annular cup, $x$, surrounding the opening in each of the said vessels. This cup contains a steam-pipe, y, and is filled with an easily-fused alloy which will retain the cap when cold, but may be used by the heat of the steam to permit the removal of the cap.

In carrying out my process by the apparatus I have shown I proceed as follows, it being understood that all the cocks are closed: The resin to be refined is placed in the receptacle A and the cap applied and sealed. The cock 1 in the pipe 108, leading from the receptacle to the pipe Q, and the cock 3 in pipe 137, leading from the pipe K to the receptacle J, are opened and the pump L is operated, exhausting the air from the receptacle A and compressing it into the vessel J. The cock 2 in pipe 105, leading from the vessel J to the vessel A, is opened, and the compressed air in the vessel J forces the solvent contained therein into the vessel A, containing the resin. The cocks 2 and 3 are then closed, and the cock 4 in pipe 106, leading from the pipe K to the vessel A, is opened, thus permitting the air exhausted from the vessel A to be forced into the lower portion thereof, and thereby serve to agitate the resin and solvent and facilitate the solution of the resin in the said solvent. An alkali—such as highly-concentrated soda or potash lye—is then introduced into the vessel A and the mass heated and agitated by steam entering through the pipe in which is located the cock 36. The cocks 1 and 4 are then closed, and the cocks 21 and 8 in the pipe 112, leading from the upper portion of the purifier B to the pipe Q, the cock 6 in the pipe 107, leading from the vessel A to the pipe K, and the cock 5 in the pipe 118, leading from the lower part of the vessel A to the lower part of the purifier B, are opened. The pump L then exhausts the air from the purifier B and forces it into the vessel A, thus causing the solution to flow from the vessel A into the purifier B. The cocks 5 and 6 are then closed and water admitted to the purifier B through the pipe X by opening cock 9, which cock is closed when a sufficient quantity of water is obtained and the mass heated. The cocks 35 and 7 in the pipe 111, leading from the lower part of the purifier B to the pipe K, are then opened, and the air being forced into the lower portion of the said purifier and exhausted from the upper portion thoroughly agitates the mass contained therein. The lye serves to separate the impurities from the resin solution, and after the mass in the purifier B has been allowed to rest, the cocks 35, 7, 21, and 8 being closed, the water, the lye, the impurities, and a portion of the solvent absorbed thereby are drawn from the said purifier through the glass vessel 105 into the receiver M by manipulating the cocks 10 and 11 above and below said glass vessel. Steam is introduced into the receiver M through the pipe 109, and, heating the contents, the solvent is volatilized and passes through the pipe 116 to the worm N, is there condensed and passes to the vessel O, and from thence to the vessel J through the pipe 131 and the cock 13. The upper portion of the vessel O being connected by the pipe 120, provided with the cock 12, to the exhaust-pipe Q, when the said cock 12 is opened the air within the vessel O, worm N, and receiver M is rarefied and the volatilization of the solvent facilitated. After the separation of the solvent from the lye solution in the receiver M, the cock 12 is closed and the residue drawn from the receiver M through the pipe 127, provided with the cock 15, which is opened for the purpose, to the decomposing-vessel P, in which the lye may be separated from the resin impurities in any suitable manner and prepared to be used again. After the lye solution is withdrawn from the purifier B, the cock 8 and the cock 20 in the branch pipe leading from the pipe 112 to the purifier C and the cocks 35 and 7 in the pipe 111 are opened; also, the cock 19 in the pipe 113, connecting the lower portions of the purifiers B and C, is opened. The air being exhausted from the purifier C through the pipe 112 and compressed into the purifier B through the pipe 111, the purified resin solution passes from the purifier B to the purifier C, in which is placed a suitable decoloring or bleaching substance—such as sulphuric acid. The cock 19 in the pipe 113 and the cock 35 in the pipe 111 are then closed, and the cock 34 in the pipe 114, leading from the pipe 111 to the bottom of the purifier C, is opened. The air is thereby exhausted from the top and enters at the bottom of the purifier C, thus thoroughly agitating the resin solution, which is at the same time heated by steam or otherwise, after which the mass is permitted to rest for a time, the cocks being all closed. The decoloring matter is then drawn from the purifier C by opening the cock 16 in the short pipe leading from the bottom of the purifier to the glass vessel 117 and opening the cock 18 in the outlet-pipe from said vessel.

When the decoloring matter has been all removed from the purifier, as will be indicated by its appearance in the glass vessel, the cock 18 is closed. The cock 17 in the pipe 119, which leads from the pipe between the glass vessel and the cock 18 to the upper portion of the purifier D, and the cock 22 in the pipe 120, connecting the upper parts of the purifiers C and D, are opened, when the decolored solution in the purifier C will flow into the purifier D, the air passing to the purifier C through the pipe 120. The cocks 16, 17, and 22 are then closed.

The solution in the purifier D is heated by steam or otherwise, and water is introduced through the pipe 126, provided with the cock 24. The cock 26 in the pipe 139, leading from the pipe K to the lower part of the purifier D, and the cock 25 in the pipe 138 are opened, thus exhausting the air from the upper portion of the purifier and forcing air into the lower portion thereof, thus thoroughly agitating the solution. The water is then removed by opening the cock 23.

The cock 25 in the pipe 138 being closed and the cock 26 in the pipe 139 remaining open; the cock 27 in the pipe 121, leading from the purifier D to the clarifier H, and the cock 28 in the pipe 123, leading from the pipe Q to the clarifier H, are opened, thus admitting air to the purifier D and exhausting the air from the clarifier H, causing the solution to flow from the said purifier into the said clarifier. The cocks are then closed and the solution subjected to heat to clarify it.

By opening the cock 30 and the cock 29 the contents of the clarifier will flow into the distilling apparatus E, and after the cocks 29 and 30 are closed and the cock 32 in the pipe 133 opened it is subjected to the action of heat by means of the steam-pipes in said distilling apparatus, driving from the solution the greater portion of the volatile solvent, which is condensed in the cooling apparatus F, and, through the pipe 133, flows into the tank J. The cock 31 in the pipe 134 being opened, the purified and bleached resin, carrying with it a portion of the solvent, will flow through the said pipe into the boiler G. The cock 31 being closed and the cock 37 opened, so as to exhaust the air from the boiler G, and the contents of the boiler subjected to the heat of a fire, the remaining solvent will be driven from the resin, and, passing through the pipe 136 to the worm R, will be condensed and flow into the receiver S. The cock 37 being closed and the cock 33 in the pipe 135 opened the solvent will flow to the tank J. The resin may then be removed from the boiler C and placed in casks or other receptacles.

I am aware that it is not new in refining resins to dissolve the crude resin in a menstruum—such as spirits of turpentine—and add an alkali to correct the acidity of the resin, then filter the solution, pump it into a still, and separate the solvent from the resin by distillation; but my invention is distinguished from such method in that after treating the resins with the solvent and the reagent, which latter removes the impurities from the solution, I then separate the reagents from the solution and recover them for reuse, then separate the solvents from the resins and recover them for reuse, thus refining the resins without any loss of the solvents or reagents. I also control the movements of the solutions by the compression and exhaustion of the air, being thus enabled to use a single air-pump for moving the solutions through the various parts of the apparatus in which I carry out my process.

I claim—

1. The within-described process of bleaching and refining resins and other similar substances, consisting in dissolving the same in a volatile substance having a low boiling-point, mixing the solution with an alkali to separate the impurities, removing the alkali with the impurities from the solution, and finally recovering the solvent and depositing the resin by evaporation, substantially as described.

2. The within-described process of bleaching and refining resins and other similar substances, consisting in first dissolving the same in a volatile substance, then mixing the solution with an alkali to separate the impurities, then removing the alkali and impurities from the solution, and then recovering the solvent and depositing the resin by evaporation, the movement of the substances during the several steps of the process being controlled by the compression and exhaustion of confined air, substantially as described.

3. The within-described process of bleaching and refining resins and other similar substances, consisting in first dissolving the same in a volatile substance, then mixing the solution with an alkali to separate the impurities, then removing the alkali and impurities from the solution, then mixing with the solution a suitable bleaching agent and removing the latter, and finally separating the resin and solvent by evaporation and recovering the latter, substantially as described.

4. In an apparatus for bleaching and refining resins, the combination of the receptacle A, in which the resin is dissolved, a series of purifiers wherein the resin solution is subjected to decolorizing substances, the pipes leading from the purifiers, through which the decolorizing substances and the impurities are drawn off, the distilling apparatus for removing the solvent from the resin, the connecting-pipes between the said parts of the apparatus, whereby the resin solution passes in succession from one to the other, the pump having both high and low pressure connections with each of the purifiers, and stopcocks in the said connections, substantially as and for the purpose set forth.

5. In an apparatus for bleaching and purifying, the combination, with the purifying-vessels, of a cap for closing the same, a channel for the reception of a fusible alloy, and a steam-pipe located in said channel, substantially as described.

In testimony whereof I have signed my name to this specification in the presence of two subscribing witnesses.

ERNST AUGUST BEHRENS.

Witnesses:
CARL URGUVITTER,
FRIEDRICH LUDWIG UNDERTICH.